(12) United States Patent
Scheimann et al.

(10) Patent No.: US 8,470,981 B2
(45) Date of Patent: Jun. 25, 2013

(54) ADDITIVES FOR THE IMPROVED DEWATERING OF CORN GLUTEN

(75) Inventors: David W. Scheimann, Joliet, IL (US); Angela S. Kowalski, Shenzhen (CN)

(73) Assignee: Nalco Company, Naperville, IL (US)

( * ) Notice: Subject to any disclaimer, the term of this patent is extended or adjusted under 35 U.S.C. 154(b) by 1571 days.

(21) Appl. No.: 11/770,973

(22) Filed: Jun. 29, 2007

(65) Prior Publication Data

US 2009/0005539 A1    Jan. 1, 2009

(51) Int. Cl.
*C07K 1/30* (2006.01)
*C07K 14/425* (2006.01)

(52) U.S. Cl.
USPC ............................. 530/421; 530/415; 530/376

(58) Field of Classification Search
USPC .......................................... 530/421, 415, 376
See application file for complete search history.

(56) References Cited

U.S. PATENT DOCUMENTS

| | | | |
|---|---|---|---|
| 3,362,829 A | 1/1968 | Landfried et al. | |
| 4,342,653 A * | 8/1982 | Halverson | 210/734 |
| 4,774,009 A | 9/1988 | Hensley et al. | |
| 4,929,361 A | 5/1990 | Polizzotti | |
| 5,283,322 A | 2/1994 | Martin et al. | |
| 5,840,850 A | 11/1998 | Palardy | |
| 5,843,238 A | 12/1998 | Palardy | |
| 6,190,462 B1 | 2/2001 | Markland et al. | |
| 6,526,675 B1 | 3/2003 | Yoon | |
| 6,648,978 B2 | 11/2003 | Liaw et al. | |
| 7,048,859 B1 * | 5/2006 | Moffett | 210/714 |
| 2003/0015476 A1 * | 1/2003 | Moffett | 210/725 |
| 2007/0036881 A1 | 2/2007 | Griffith | |

OTHER PUBLICATIONS

Bray, Walter J. (Journal of the Science of Food and Agriculture (1979), 30(2), 171-176.*
Khalil, M. I (Starch/Staerke, (2001), 53 (7) 323-329).*
K.D. Rausch, Characterization of Gluten Processing Streams, Bioresource Technology, 89, 163-167, 2003.

* cited by examiner

*Primary Examiner* — David Lukton
(74) *Attorney, Agent, or Firm* — Edward O. Yonter; Andrew D. Sorensen

(57) ABSTRACT

The invention relates to a method of dewatering corn gluten stream wherein coagulant is add to the corn gluten stream of the corn wet milling process. The method of dewatering corn gluten uses an effective amount of a coagulant of one or more anionic polymers, the anionic polymers comprising one or more anionic monomers. The method further includes a process for separating the water from the gluten using a solids/liquids filtration device.

22 Claims, No Drawings

US 8,470,981 B2

ADDITIVES FOR THE IMPROVED DEWATERING OF CORN GLUTEN

COPYRIGHT NOTICE

A portion of the disclosure of this patent document contains or may contain copyright protected material. The copyright owner has no objection to the photocopy reproduction by anyone of the patent document or the patent disclosure in exactly the form it appears in the Patent and Trademark Office patent file or records, but otherwise reserves all copyright rights whatsoever.

TECHNICAL FIELD

This invention relates to a process to enhance the removal of water from wet gluten in a gluten dewatering operation. The invention allows for the improved dewaterability of the gluten solids by the addition of an anionic polymer such as sodium polyacrylate to a wet gluten stream prior to the dewatering step. The present invention is also effective with the use of a vacuum filtration and pressure filtration units.

BACKGROUND

In the wet milling of corn, the dry corn kernels processed in a series of unit operations in order to separate the four primary components of the corn kernel starch, germ, gluten and fiber. The first step in the process is inspection and cleaning of the corn where damaged or cracked kernels as well as foreign material that may have come in during shipping or harvest are removed. The next step is stepping where the kernels are soaked in water with 0.1% SO2 for 30 to 50 hours in order to hydrate and soften the kernels. During the steeping process the starch-gluten bonds are broken down in order to prepare the kernels for further processing. The steeped kernels are then sent to a grinding mill where they are essentially cracked open to expose the germ. The germ is removed, washed and dried by mechanical means in a number of different unit operations and then sent to a corn oil refining operation for further processing. The process stream containing the starch, fiber and gluten is then sent to a secondary grinding process where a much finer grind is performed. The fiber fraction is separated from the stream by filtration, washed and dried in a number of mechanical unit operations. The fiber fraction, which also contains the hull is sent to the feed house for incorporation in one of the animal feed co-products referred to as corn gluten feed. The remaining process stream containing the starch, gluten and water is sent to a series of bowl type or disk nozzle centrifuges. In these centrifuges the starch and gluten are separated from one another based upon the density difference of the two materials. The process stream containing the starch fraction is referred to as mill starch is then sent to a series of mechanical operations where the starch will be washed, concentrated and then dried. The starch can then be transferred to another part of the processing plant a raw material for a use in a number of different processes or products like conversion to fructose or dextrose.

The remaining stream containing the gluten, which at this point is called light gluten is processed in centrifuges where the solids are concentrated to about double that of the incoming stream and are referred to as heavy gluten. The heavy gluten containing 12% to 16% by weight solids is then dewatered using rotary drum vacuum filters to produce a gluten cake typically containing 35 to 40% solids. The gluten is transferred to the feed house operation by screw conveyor where the material will be dried to 88% solids and will be used as the primary component of a high value feed co-product referred to as corn gluten meal.

The steep water is typically concentrated by evaporation in order to recover the soluble protein extracted in the steeping process. Once concentrated it will be combined with fiber and hull extracted earlier in the wet milling process and dried to 88% solids to produce corn gluten feed.

In the corn wet milling process the fractionation of the corn kernel is an energy intensive process. There are a lot of mechanical unit operations involved in the various cleaning, separation and drying steps that must occur in order to prepare each of the primary components for the downstream processing operations. The gluten dewatering and drying process accounts for the second largest energy usage or about 28% of the total energy used in the corn wet milling operation. The gluten dewatering and drying process begins at the centrifuges just after the starch fraction is removed and the light gluten is transferred to a holding tank. The light gluten stream contains the bulk of the insoluble protein recovered in the wet milling process. The light gluten from the holding tank is pumped to the gluten concentration centrifuges, which are bowl type centrifuges used to concentrate the gluten solids from 7% to about 14% by weight solids. The heavy gluten is sent to a holding tank for further processing. The heavy gluten is then pumped to rotary drum vacuum filters, which are typically connected in parallel and are used to dewater the heavy gluten. The filters typically produce a gluten cake with a solids content in the range of 35% to 40% by weight solids. Depending upon size and throughput a typical wet mill may have as many as 5 or 10 large rotary drum vacuum filters in operation. Some plants may utilize horizontal vacuum belt filters such as a Larox Pannevis filter while others may utilize a pressure filtration devices like a Pneumapress pressure filter or Larox pressure filters. The operational parameters for the filters have optimized by the filter manufacturers and the operation personnel in the plants to achieve a balance between solids throughput and gluten cake moisture content. As the industry has have gradually improved the throughput and efficiency of some of the up front end processing techniques in the wet milling process for some plants the gluten dewatering process has become a production bottleneck. The production bottleneck in some plants may limit or reduce some of the production efficiencies gained in the front end of the plant.

The use of surfactants type chemistries in the corn wet milling process for gluten dewatering is known and is discussed in the flowing patents.

U.S. Pat. No. 5,283,322 discloses the use of selected nonionic surfactants for enhancing gluten dewatering. The nonionic surfactants claimed are those of the family of oxyalkylated sorbitan fatty esters, which are applied to the gluten stream and then processed, in the dewatering device.

U.S. Pat. No. 5,840,850 discloses the use of selected anionic surfactants for enhancing gluten dewatering. The anionic surfactants claimed are those particularly the sulfates and sulfonates, which are applied to the gluten stream and then processed, in the dewatering device.

U.S. Pat. No. 3,362,829 discloses a process for coating vital wheat gluten/powdered) with nonionic hydrophilic lipid selected from the class consisting of monoglycerides, salts of lactylic esters of fatty acids, polyoxyethylene stearate, and stearyl monoglyceridyl citrate whereby the gluten particles are characterized by stability against particle cohesion in neutral aqueous dispersions. The use of polyoxyethylene sorbitan monostearate in combination with hydrophilic lipids is also disclosed. It also discusses the use of a surface active agent to aid in initial dispersion of the vital wheat gluten.

The use of other pressure filtration equipment in the corn wet milling process for gluten dewatering is known and is discussed in the flowing patents.

U.S. Pat. No. 4,774,009 discloses a process for dewatering slurry streams produced from a corn wet milling process, and more particularly, a method for dewatering slurry product streams containing gluten, starch and bran using an automatic pressure filter.

SUMMARY

The current invention describes the following key aspects:
1. It is an advantage of the invention to assist in the dewatering of gluten.
2. It is an advantage of the invention to provide a method of production whereby a more stable form of the product is achieved.
3. It is an advantage of the invention allows a process logic that enabling a continuous or semi-continuous production of the gluten.
4. Provides a method for uninterrupted production.
5. Provides a method for improved production and throughput

DETAILED DESCRIPTION

The present inventors discovered that the addition of an anionic polymer of sodium polyacrylate to a wet gluten stream prior to the dewatering step enhanced the dewaterability of the gluten on the vacuum filtration and pressure filtration equipment. The typical gluten production process is a multiple step process in which the gluten dewatering process is a rate limiting step in both solids throughput and recovery. The conventional practice for gluten dewatering is concentration by centrifuge to 12-14% suspended solids, dewatering on a vacuum drum filter to 40% solids and then drying the gluten to greater than 88% solids (or less than 12% moisture) for storage and handling.

In particular it has been discovered that the addition of anionic polymer of sodium polyacrylate prior to dewatering in a filtration device at concentrations of 10 ppm to 2000 ppm significantly improve the dewatering ability of the filtration equipment. The dosages referenced are based upon product actives and the composition or dry solids content of the gluten stream being treated. The composition of the active polymer can be a homopolymer of Sodium acrylate or a copolymer with any of the following monomers: Sodium (Meth)acrylate, acrylamido-propylsulfonic acid sodium salt, acrylamide, methacrylamide, N-methylacrylamide, N,N-dimethyl acrylamide, vinylpyrolidone, N-vinylformamide, hydroxyethylacrylate.

Both laboratory tests and pilot testing have shown that the dewaterability of gluten can be improved by 5% to 30% in both vacuum filtration and pressure filtration equipment. The degree of improvement may be dependent upon the dosage of the processing aid and the composition and characteristics of the particular gluten stream.

EXAMPLES

All testing was conducted using process samples provided by major U.S. corn wet milling facilities. Samples used for the testing were obtained from several different sampling points in the gluten concentration and dewatering process. Samples of light gluten were collected from sampling points between the starch/gluten separation centrifuge and the gluten dewatering centrifuge. Samples of heavy gluten were collected from sampling points between the starch/gluten separation centrifuge and the rotary drum vacuum filters.

A modified buchner funnel technique was used as the laboratory testing apparatus. The testing apparatus was equipped with a vacuum sensing apparatus connected to a monitor with data logging capabilities. Suitable paper filters were used as the filtration media for the lab testing instead of standard filter cloth in order to eliminate the potential impact of residual material from sequential testing runs. The use of replaceable filter paper also reduced the effect of fouling of the filter fabric due to accumulation of the protienacious material on the surface and in the pores of the filter. The use of a filter paper also allowed solids determination of the entire gluten cake sample generated in the testing.

The laboratory experiments consisted of obtaining a suitable size sample of the desired gluten slurry for testing. The samples were continuously mixed to maintain sample homogeneity. A recirculated water bath was used to maintain the gluten at the desired temperature for testing. The gluten slurry was analyzed for total solids, total dissolved solids and total suspended solids in order to determine the desired sample size for testing. The desired test sample was then weighed out on a balance and conditioned with an appropriate dosage of the processing aid. The samples were placed on a programmable gang stirrer so that each sample received uniform mixing. The rapid mix and slow mix as well as standing time and mix speed rpm could be optimized for the particular sample or processing aid treatment. The samples would then be transferred to the buchner funnel apparatus into which had been placed a pre-weighed filter paper. The data acquisition system was used to collect the data from the vacuum dewatering profile of the sample. The vacuum source was maintained at 20 inches of mercury throughout the testing period. At the completion of the testing, the sample would be removed from the vacuum apparatus and a wet weight of the gluten cake was determined. The gluten cake sample was then dried to constant weight at in an oven in order to allow determination of the gluten cake moisture content. The raw data from the vacuum profiles then be plotted and analyzed in order to draw comparisons between the different treatment programs, scenarios and testing parameters. In most cases multiple runs of each sample were conducted in order to establish a baseline and eliminate some of the inherent variability in the testing method and sample consistancy. Data analysis ands comparisons were conducted on individual runs as well on data averages from multiple runs.

In each of the following examples a different gluten sample was tested. Tables 1 thru 11 provide summary tables for the results from each series of tests. Table 12 describes the processing aids that were evaluated in the testing.

Example 1

This example illustrates the improved dewater ability of the heavy gluten as a result of treatment with selected processing aids. Multiple tests were conducted in order to eliminate some of the variability in the testing. In this testing gluten samples of 200 g were evaluated. Data from the testing showed that on average an 18.6% improvement in the rate of dewaterability was observed on the samples treated with Nalco TX-13368 prior to dewatering. The data also showed that the effective dosages were in the range of 200 to 400 ppm of product as treated. Testing also showed that TX-12621 was not effective in improving the rate of dewaterability.

TABLE 1

| Sample | Time to Vacuum Break (min) | % Improvement (avg Untreated) |
|---|---|---|
| Untreated | 7.33 | −3.79 |
| Untreated | 6.75 | 4.42 |
| Untreated | 7.25 | −2.65 |
| Untreated | 6.92 | 2.02 |
| Average | 7.06 | 0.00 |
| 100 ppm TX-13368 | 6.50 | 7.96 |
| 200 ppm N-TX13368 | 5.33 | 24.53 |
| 200 ppm N-TX13368 | 6.17 | 12.64 |
| Average | 5.75 | 18.58 |
| 400 ppm TX-13368 | 5.83 | 17.45 |
| 600 ppm TX-13368 | 5.42 | 23.26 |
| 800 ppm TX-13368 | 5.17 | 26.80 |
| 100 ppm TX-12621 | 7.33 | −3.79 |
| 300 ppm TX-12621 | 7.00 | 0.88 |
| 600 ppm TX-12621 | 6.92 | 2.02 |
| 750 ppm TX-12621 | 8.33 | −17.95 |

Example 2

This example illustrates the improved dewater ability of the heavy gluten as a result of treatment with selected processing aids. Multiple tests were conducted in order to eliminate some of the variability in the testing. In this testing gluten samples of 200 g were evaluated. Data from the testing showed that on average a 22.7% improvement in the rate of dewater ability was observed on the samples treated with Nalco TX-13368 prior to dewatering. The data also showed that the effective dosages were in the range of 400 to 500 ppm of product as treated.

TABLE 2

| Sample | Time to Vacuum Break (min) | % Improvement (avg Untreated) |
|---|---|---|
| Untreated | 6.08 | −1.00 |
| Untreated | 5.58 | 7.31 |
| Untreated | 6.25 | −3.82 |
| Untreated | 6.17 | −2.49 |
| Average | 6.02 | 0.00 |
| 400 ppm N-TX13368 | 4.83 | 19.77 |
| 400 ppm N-TX13368 | 4.50 | 25.25 |
| 400 ppm N-TX13368 | 5.00 | 16.94 |
| 400 ppm N-TX13368 | 4.25 | 29.40 |
| 400 ppm N-TX13368 | 4.67 | 22.43 |
| Average | 4.65 | 22.76 |
| 500 ppm N-TX13368 | 5.17 | 14.12 |
| 500 ppm N-TX13368 | 4.58 | 23.92 |
| 500 ppm N-TX13368 | 4.92 | 18.27 |
| 500 ppm N-TX13368 | 4.50 | 25.25 |
| Average | 4.79 | 20.39 |

Example 3

This example illustrates the improved dewater ability of the heavy gluten as a result of treatment with selected processing aids. Multiple tests were conducted in order to eliminate some of the variability in the testing. In this testing gluten samples of 200 g were evaluated. Data from the testing showed that on average a 4.8% to 23.5% improvement in the rate of dewater ability was observed on the samples treated with Nalco TX-13368 prior to dewatering. The data also showed that the effective dosages were in the range of 200 to 500 ppm of product as treated.

TABLE 3

| Sample | Time to Vacuum Break (min) | % Improvement (avg Untreated) |
|---|---|---|
| Untreated | 4.75 | 3.06 |
| Untreated | 4.83 | 1.43 |
| Untreated | 4.92 | −0.41 |
| Untreated | 4.75 | 3.06 |
| Untreated | 5.25 | −7.14 |
| Average | 4.90 | 0.00 |
| 200 ppm N-TX13368 | 4.42 | 9.80 |
| 200 ppm N-TX13368 | 4.33 | 11.63 |
| 200 ppm N-TX13368 | 5.08 | −3.67 |
| 200 ppm N-TX13368 | 4.83 | 1.43 |
| Average | 4.67 | 4.80 |
| 300 ppm N-TX13368 | 4.17 | 14.90 |
| 300 ppm N-TX13368 | 4.33 | 11.63 |
| 300 ppm N-TX13368 | 4.42 | 9.80 |
| 300 ppm N-TX13368 | 4.75 | 3.06 |
| Average | 4.42 | 9.85 |
| 400 ppm N-TX13368 | 4.33 | 11.63 |
| 400 ppm N-TX13368 | 4.08 | 16.73 |
| 400 ppm N-TX13368 | 4.33 | 11.63 |
| 400 ppm N-TX13368 | 4.17 | 14.90 |
| Average | 4.23 | 13.72 |
| 500 ppm N-TX13368 | 3.92 | 20.00 |
| 500 ppm N-TX13368 | 3.58 | 26.94 |
| Average | 3.75 | 23.47 |

Example 4

This example illustrates the improved dewater ability of the heavy gluten as a result of treatment with selected processing aids. Multiple tests were conducted in order to eliminate some of the variability in the testing. In this testing gluten samples of 200 g were evaluated. Data from the testing showed that on average a 14.5% improvement in the rate of dewater ability was observed on the samples treated with Nalco TX-13368 prior to dewatering. The data also showed that the effective dosages were in the range of 400 ppm of product as treated. Data also shows that Tween 80N was not effective in dewatering the heavy gluten. The data also shows that Nalco 8681 was not effective in improving the dewater ability of the heavy gluten.

TABLE 4

| Sample | Time to Vacuum Break (min) | % Improvement (avg Untreated) |
|---|---|---|
| Untreated | 6.33 | 5.94 |
| Untreated | 6.67 | 0.89 |
| Untreated | 7 | −4.01 |
| Untreated | 6.92 | −2.82 |
| Average | 6.73 | 0.00 |
| 400 ppm N-TX13368 | 5.75 | 14.56 |
| 400 ppm N-TX13368 | 6.17 | 8.32 |
| 400 ppm N-TX13368 | 5.08 | 24.52 |
| 400 ppm N-TX13368 | 6.00 | 10.85 |
| Average | 5.75 | 14.56 |
| 250 ppm Tween 80 | 7.00 | −4.01 |
| 500 ppm Tween 80 | 7.17 | −6.54 |
| 1000 ppm Tween 80 | 7.67 | −13.97 |
| 1000 ppm Tween 80 | 7.50 | −11.44 |
| 250 ppm N-8681 | 11.67 | −73.40 |
| 500 ppm N-8681 | 20.67 | −207.13 |
| Average | 16.17 | −140.27 |

Example 5

This example illustrates the improved dewater ability of the heavy gluten as a result of treatment with selected processing aids. Multiple tests were conducted in order to eliminate some of the variability in the testing. In this testing gluten samples of 200 g were evaluated. Data from the testing showed that on average a 35.8% improvement in the rate of dewater ability was observed on the samples treated with Nalco TX-13368 prior to dewatering. The data also showed that the effective dosages were in the range of 400 ppm of product as treated.

TABLE 5

| Sample | Time to Vacuum Break (min) | % Improvement (avg Untreated) |
| --- | --- | --- |
| Untreated | 1 | 14.38 |
| Untreated | 1.17 | −0.17 |
| Untreated | 1.17 | −0.17 |
| Untreated | 1.08 | 7.53 |
| Untreated | 1.42 | −21.58 |
| Average | 1.17 | 0.00 |
| 400 ppm N-TX13368 | 0.92 | 21.23 |
| 400 ppm N-TX13368 | 0.83 | 28.94 |
| 400 ppm N-TX13368 | 0.75 | 35.79 |
| 400 ppm N-TX13368 | 0.67 | 42.64 |
| 400 ppm N-TX13368 | 0.58 | 50.34 |
| Average | 0.75 | 35.79 |

Example 6

This example illustrates the improved dewater ability of the heavy gluten as a result of treatment with selected processing aids. Multiple tests were conducted in order to eliminate some of the variability in the testing. In this testing gluten samples of 100 g and 200 grams were evaluated. Data from the testing with 100 gram samples showed that on average a 12.4% improvement in the rate of dewater ability was observed on the samples treated with Nalco TX-13368 prior to dewatering. Data from the testing with 200 gram samples showed that on average a 7.5% improvement in the rate of dewater ability was observed on the samples treated with Nalco TX-13368 prior to dewatering The data also showed that the effective dosages were in the range of 400 ppm of product as treated.

TABLE 6

| Sample | Time to Vacuum Break (min) | % Improvement (avg Untreated) |
| --- | --- | --- |
| Untreated | 1.08 | −3.05 |
| Untreated | 1.17 | −11.64 |
| Untreated | 1.08 | −3.05 |
| Untreated | 1.08 | −3.05 |
| Untreated | 0.83 | 20.80 |
| Average | 1.05 | 0.00 |
| 400 ppm N-TX13368 | 0.92 | 12.21 |
| 400 ppm N-TX13368 | 0.92 | 12.21 |
| 400 ppm N-TX13368 | 0.83 | 20.80 |
| 400 ppm N-TX13368 | 0.92 | 12.21 |
| 400 ppm N-TX13368 | 1.00 | 4.58 |
| Average | 0.92 | 12.40 |
| 200 g Samples | | |
| Untreated | 3.08 | 7.60 |
| Untreated | 3.25 | 2.50 |
| Untreated | 3.67 | −10.10 |
| Average | 3.33 | 0.00 |
| 400 ppm N-TX13368 | 2.83 | 15.10 |
| 400 ppm N-TX13368 | 3.00 | 10.00 |
| 400 ppm N-TX13368 | 3.42 | −2.60 |
| Average | 3.08 | 7.50 |

Example 7

This example illustrates the improved dewater ability of the heavy gluten as a result of treatment with selected processing aids. Multiple tests were conducted in order to eliminate some of the variability in the testing. In this testing gluten samples of 100 g were evaluated. Data from the testing showed that on average a 19.4 to 27.7% improvement in the rate of dewater ability was observed on the samples treated with Nalco TX-13368 prior to dewatering. The data also showed that the effective dosages were in the range of 200 ppm to 400 ppm of product as treated.

TABLE 7

| Sample | Time to Vacuum Break (min) | % Improvement (avg Untreated) |
| --- | --- | --- |
| Untreated | 1.92 | 4.10 |
| Untreated | 2.08 | −3.90 |
| Untreated | 2.17 | −8.39 |
| Untreated | 1.92 | 4.10 |
| Untreated | 1.92 | 4.10 |
| Average | 2.00 | 0.00 |
| 400 ppm N-TX13368 | 1.42 | 29.07 |
| 400 ppm N-TX13368 | 1.50 | 25.07 |
| 400 ppm N-TX13368 | 1.42 | 29.07 |
| Average | 1.45 | 27.74 |
| 300 ppm N-TX13368 | 1.67 | 16.58 |
| 300 ppm N-TX13368 | 1.75 | 12.59 |
| 300 ppm N-TX13368 | 1.42 | 29.07 |
| Average | 1.61 | 19.41 |
| 200 ppm N-TX13368 | 1.67 | 16.58 |
| 200 ppm N-TX13368 | 1.42 | 29.07 |
| 200 ppm N-TX13368 | 1.67 | 16.58 |
| Average | 1.59 | 20.75 |

Example 8

This example illustrates the improved dewater ability of the heavy gluten as a result of treatment with selected processing aids. Multiple tests were conducted in order to eliminate some of the variability in the testing. In this testing gluten samples of 100 g were evaluated. Data from the testing showed that on average a 35.6% improvement in the rate of dewater ability was observed on the samples treated with Nalco TX-13368 prior to dewatering. The data also showed that the effective dosages were in the range of 200 to 400 ppm of product as treated.

TABLE 8

| Sample | Time to Vacuum Break (min) | % Improvement (avg Untreated) |
| --- | --- | --- |
| Untreated | 1.5 | −3.69 |
| Untreated | 1.42 | 1.84 |
| Untreated | 1.42 | 1.84 |
| Average | 1.45 | 0.00 |
| 400 ppm N-TX13368 | 1.00 | 30.88 |
| 400 ppm N-TX13368 | 0.67 | 53.69 |
| 400 ppm N-TX13368 | 1.17 | 19.12 |
| Average | 0.95 | 34.56 |

Example 9

This example illustrates the improved dewater ability of the heavy gluten as a result of treatment with selected processing aids. Multiple tests were conducted in order to eliminate some of the variability in the testing. In this testing gluten samples of 100 g were evaluated. Data from the testing showed that on average a 7.1 to 26.5% improvement in the rate of dewater ability was observed on the samples treated with Nalco TX-13368 prior to dewatering. The data also showed that the effective dosages were in the range of 200 to 500 ppm of product as treated.

TABLE 9

| Sample | Time to Vacuum Break (min) | % Improvement (avg Untreated) |
| --- | --- | --- |
| Untreated | 1.17 | 8.88 |
| Untreated | 1.25 | 2.65 |
| Untreated | 1.33 | −3.58 |
| Untreated | 1.25 | 2.65 |
| Untreated | 1.42 | −10.59 |
| Average | 1.28 | 0.00 |
| 200 ppm N-TX13368 | 1.25 | 2.65 |
| 200 ppm N-TX13368 | 1.25 | 2.65 |
| 200 ppm N-TX13368 | 1.08 | 15.89 |
| Average | 1.19 | 7.06 |
| 300 ppm N-TX13368 | 1.00 | 22.12 |
| 300 ppm N-TX13368 | 1.17 | 8.88 |
| 300 ppm N-TX13368 | 1.25 | 2.65 |
| Average | 1.14 | 11.21 |
| 400 ppm N-TX13368 | 1.17 | 8.88 |
| 400 ppm N-TX13368 | 1.00 | 22.12 |
| 400 ppm N-TX13368 | 1.00 | 22.12 |
| Average | 1.06 | 17.71 |
| 500 ppm N-TX13368 | 0.92 | 28.35 |
| 500 ppm N-TX13368 | 1.08 | 15.89 |
| 500 ppm N-TX13368 | 0.83 | 35.36 |
| Average | 0.94 | 26.53 |

Example 10

This example illustrates the improved dewater ability of the heavy gluten as a result of treatment with selected processing aids. Multiple tests were conducted in order to eliminate some of the variability in the testing. In this testing gluten samples of 100 g were evaluated. Data from the testing showed that on average a 13.4 to 17.4% improvement in the rate of dewater ability was observed on the samples treated with Nalco TX-13711 prior to dewatering. The data also showed that the effective dosages were in the range of 200 to 500 ppm of product as treated.

TABLE 10

| Sample | Time to Vacuum Break (min) | % Improvement (avg Untreated) |
| --- | --- | --- |
| Untreated | 5.33 | 2.20 |
| Untreated | 5.17 | 5.14 |
| Untreated | 5.5 | −0.92 |
| Untreated | 5.33 | 2.20 |
| Untreated | 5.92 | −8.62 |
| Average | 5.45 | 0.00 |
| 400 ppm N-TX13711 | 4.42 | 18.90 |
| 400 ppm N-TX13711 | 4.58 | 15.96 |
| 400 ppm N-TX13711 | 4.50 | 17.43 |
| Average | 4.50 | 17.43 |
| 300 ppm N-TX13711 | 4.50 | 17.43 |
| 300 ppm N-TX13711 | 4.42 | 18.90 |
| 300 ppm N-TX13711 | 5.17 | 5.14 |
| Average | 4.70 | 13.82 |
| 200 ppm N-TX13711 | 5.08 | 6.79 |
| 200 ppm N-TX13711 | 4.83 | 11.38 |
| 200 ppm N-TX13711 | 4.25 | 22.02 |
| Average | 4.72 | 13.39 |

Example 11

This example illustrates the improved dewater ability of the heavy gluten as a result of treatment with selected processing aids. Multiple tests were conducted in order to eliminate some of the variability in the testing. In this testing gluten samples of 200 g were evaluated. Data from the testing showed that on average an 18.8% improvement in the rate of dewater ability was observed on the samples treated with Nalco TX-13368 prior to dewatering. The data also showed that the effective dosages were in the range of 200 to 500 ppm of product as treated.

TABLE 11

| Sample | Time to Vacuum Break (min) | % Improvement (avg Untreated) |
| --- | --- | --- |
| Untreated | 5.75 | 6.26 |
| Untreated | 6.17 | −0.59 |
| Untreated | 6.25 | −1.89 |
| Untreated | 6.17 | −0.59 |
| Untreated | 6.33 | −3.20 |
| Average | 6.13 | 0.00 |
| 400 ppm N-TX13368 | 5.17 | 15.72 |
| 400 ppm N-TX13368 | 5.42 | 11.64 |
| 400 ppm N-TX13368 | 4.67 | 23.87 |
| 400 ppm N-TX13368 | 4.67 | 23.87 |
| 400 ppm N-TX13368 | 5.17 | 15.72 |
| Average | 5.02 | 18.16 |
| 250 ppm N-8975 | 6.33 | −3.20 |
| 500 ppm N-8975 | 5.33 | 13.11 |
| 750 ppm N-8975 | 6.42 | −4.66 |
| 1000 ppm N-8975 | 5.83 | 4.96 |
| Average | 5.98 | 2.55 |
| 250 ppm N-8978 | 5.50 | 10.34 |
| 500 ppm N-8978 | 6.00 | 2.18 |
| 750 ppm N-8978 | 6.25 | −1.89 |
| 1000 ppm N-8978 | 6.00 | 2.18 |
| Average | 5.94 | 3.20 |
| Sodium Lauryl Sulfate | | |
| 250 ppm Shepard WAC | 6.25 | −1.89 |
| 500 ppm Shepard WAC | 6.00 | 2.18 |
| 750 ppm Shepard WAC | 5.83 | 4.96 |
| 1000 ppm Shepard WAC | 5.58 | 9.03 |
| Average | 5.92 | 3.57 |
| Sodium Lauryl Sulfate | | |
| 250 ppm SulfoChem SLS | 5.67 | 7.56 |
| 500 ppm SulfoChem SLS | 5.75 | 6.26 |
| 750 ppm SulfoChem SLS | 5.75 | 6.26 |
| 1000 ppm SulfoChem SLS | 5.83 | 4.96 |
| Average | 5.75 | 6.26 |

Example 12

| Sample | Generic Description |
| --- | --- |
| Nalco TX-13368 | Sodium Poly Acrylate/ACAM |
| Nalco TX-13711 | Sodium Poly Acrylate |
| Nalco TX-12621 | Anionic Flocculant |
| N-8975 | Proprietary |
| N-8978 | Proprietary |
| N-8681 | High molecular weight nonionic copolymer |
| Tween 80 | Polyoxyethylene sorbitan monooleate |
| Shepard WAC | Sodium Lauryl Sulfate |
| SulfoChem SLS | Sodium Lauryl Sulfate |

The foregoing may be better understood by reference to the following examples, which are intended to illustrate methods for carrying out the invention and are not intended to limit the scope of the invention.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

It is claimed:

1. A method of dewatering a corn gluten stream, the method comprising:
   (i) Adding to the corn gluten stream comprised of water and corn gluten of a corn wet milling process an effective amount of a coagulant comprising at least one anionic polymer of sodium acrylate; and
   (ii) Separating the water from the corn gluten using a solids/liquids filtration device.

2. The method of claim 1 wherein the anionic polymer is a homopolymer of sodium acrylate.

3. The method of claim 1 wherein the anionic polymer is a copolymer with at least one monomer selected from sodium (Meth)acrylate, acrylamido-propylsulfonic acid sodium salt, acrylamide, methacrylamide, N-methylacrylamide, N,N-dimethyl acrylamide, vinylpyrolidone, N-vinylformamide, and hydroxyethylacrylate.

4. The method of claim 1 wherein the anionic polymer comprises at least one monomer selected from the group consisting of acrylic acid and acrylamide.

5. The method of claim 1 wherein the anionic polymer has an anionic charge of about 70 to 100 mole percent.

6. The method of claim 1 wherein the anionic polymer has an anionic charge of about 95 to 100 mole percent.

7. The method of claim 1 wherein the anionic polymer has an intrinsic viscosity of about 0.2 dL/g to 5.0 dL/g.

8. The method of claim 1 wherein the coagulant further comprises one or more cross linking agents.

9. The method of claim 8 wherein the cross linking agents are selected from any combination of methylene-bis acrylamide, diglycidal ethers and diacrylate esters.

10. The method of claim 1 wherein the anionic polymer has a reduced specific viscosity of about 0.2 dL/g to 6.0 dL/g.

11. The method of claim 1 wherein about 50 to 1000 ppm of the coagulant is added to the corn gluten stream of the corn wet milling process.

12. The method of claim 1 comprising adding the coagulant in the corn gluten stream of the corn wet milling process simultaneously as the corn gluten stream is being sent to the solids/liquids filtration device.

13. The method of claim 12 wherein the coagulant is added before the addition of the corn gluten stream of the corn wet milling process to the solids/liquids filtration device.

14. The method of claim 1 wherein the solids/liquids filtration device uses pneumatic pressure.

15. The method of claim 1 wherein the solids/liquids filtration device uses hydraulic pressure in the system.

16. The method of claim 1 wherein the solids/liquids filtration device is used to treat a heavy gluten component of the corn gluten stream of the corn wet milling process.

17. The method of claim 1 wherein the solids/liquids filtration device is a rotary drum vacuum filter.

18. The method of claim 1 wherein the solids/liquids filtration device is a vacuum table filter.

19. The method of claim 1 wherein the solids/liquids filtration device is a pressure filtration system.

20. The method of claim 19 wherein the pressure filtration system is a recess chamber press.

21. The method of claim 19 wherein the pressure filtration system is a plate and frame press.

22. The method of claim 1 wherein the anionic polymer is a copolymer.

* * * * *